(12) United States Patent
Tang

(10) Patent No.: US 10,222,190 B2
(45) Date of Patent: Mar. 5, 2019

(54) TRUCK FOR LOADING EMULSION EXPLOSIVE IN FIELD WITH INTRINSIC SAFETY

(71) Applicant: SHIJIAZHUANG SUCCESS MACHINERY ELECTRICAL CO., LTD., Shijiazhuang, Hebei (CN)

(72) Inventor: Qiuming Tang, Shijiazhuang (CN)

(73) Assignee: SHIJIAZHUANG SUCCESS MACHINERY ELECTRICAL CO., LTD., Shijiazhuang (CN)

( * ) Notice: Subject to any disclaimer, the term of this patent is extended or adjusted under 35 U.S.C. 154(b) by 0 days.

(21) Appl. No.: 15/514,056

(22) PCT Filed: Sep. 26, 2014

(86) PCT No.: PCT/CN2014/087504
§ 371 (c)(1),
(2) Date: May 2, 2017

(87) PCT Pub. No.: WO2016/045078
PCT Pub. Date: Mar. 31, 2016

(65) Prior Publication Data
US 2017/0254629 A1    Sep. 7, 2017

(51) Int. Cl.
*B01F 13/10* (2006.01)
*B01F 5/06* (2006.01)
(Continued)

(52) U.S. Cl.
CPC .............. *F42D 1/10* (2013.01); *B62D 63/02* (2013.01); *C06B 21/00* (2013.01); *F17D 1/086* (2013.01);
(Continued)

(58) Field of Classification Search
CPC ....... B01F 13/10; B01F 5/0256; B01F 5/0602
(Continued)

(56) References Cited

U.S. PATENT DOCUMENTS

| 4,526,633 A | 7/1985 | Lawrence et al. |
| 2007/0277916 A1* | 12/2007 | Halander ............ C06B 21/0008 149/109.6 |

(Continued)

FOREIGN PATENT DOCUMENTS

| CN | 101968334 A | 2/2011 |
| CN | 202709900 U | 1/2013 |

(Continued)

OTHER PUBLICATIONS

Jun. 17, 2015 Written Opinion issued in Interntional Patent Application No. PCT/CN2014/087504.
(Continued)

*Primary Examiner* — David L Sorkin
(74) *Attorney, Agent, or Firm* — Oliff PLC

(57) ABSTRACT

A truck for loading emulsion explosive in field with intrinsic safety, with its key improvement being a static emulsification device and a static sensitizing device to perform emulsification and sensitization, wherein, an outlet of the static emulsification device is connected with a transporting hose, a terminal end of a sensitizer storage transporting system is connected to a starting end of the transporting hose, and the static sensitizing device is arranged at a terminal end of the transporting hose. Its advantages include the transporting of emulsion explosive product is avoided, thereby reducing safety risk; on the other hand, the emulsification device and sensitizing device utilized by this truck both have static structure, so that there exists no shear or mechanical friction during the emulsification and sensitizing process, thereby reducing sensitivity, preventing explosion form happening in the production process, and ensuring production safety.

9 Claims, 3 Drawing Sheets

(51) Int. Cl.
    *F42D 1/10*     (2006.01)
    *C06B 21/00*     (2006.01)
    *B62D 63/02*     (2006.01)
    *F17D 1/08*     (2006.01)
    *B01F 15/02*     (2006.01)
    *B60R 21/00*     (2006.01)
    *B62D 39/00*     (2006.01)
    *B62D 61/10*     (2006.01)

(52) U.S. Cl.
    CPC ........... *B01F 13/10* (2013.01); *B01F 15/0201* (2013.01); *B01F 15/0203* (2013.01); *B01F 15/0243* (2013.01); *B60R 2021/0074* (2013.01); *B60Y 2200/80* (2013.01); *B62D 39/00* (2013.01); *B62D 61/10* (2013.01)

(58) Field of Classification Search
    USPC ................... 366/138, 162.4, 181.5, 336, 340
    See application file for complete search history.

(56) References Cited

U.S. PATENT DOCUMENTS

| | | | |
|---|---|---|---|
| 2010/0296362 A1 | 11/2010 | Halander et al. | |
| 2015/0003186 A1* | 1/2015 | Xue | F42D 1/10 366/138 |
| 2015/0033969 A1* | 2/2015 | Gore | C06B 21/0008 102/313 |

FOREIGN PATENT DOCUMENTS

| | | |
|---|---|---|
| CN | 103304348 A | 9/2013 |
| EP | 1571136 A2 | 9/2005 |
| GB | 2126910 A | 4/1984 |
| GB | 2338429 A | 12/1999 |

OTHER PUBLICATIONS

Jun. 17, 2015 International Search Report issued in International Patent Application No. PCT/CN2014/087504.

May 2, 2018 Extended European Search Report issued in European Patent Application No. 14902394.7.

* cited by examiner

TRUCK FOR LOADING EMULSION EXPLOSIVE IN FIELD WITH INTRINSIC SAFETY

TECHNICAL FIELD

The present invention relates to the technical field of blasting equipment, in particular relates to a truck for loading emulsion explosive in field with intrinsic safety.

BACKGROUND

Emulsion explosive is a new type of product developed since 1970s. The emulsion explosive technology is first comprehensively elaborated by Blabm of U.S. in 1969. The earliest emulsion explosive is not sensitive to a detonator, and must be detonated by means of a relay initiating agent. Later, with progress in the research of emulsion explosive, the subsequently developed emulsion explosive has sensitivity to a detonator as well, and has advantages such as good water-resistance, good blast performance, low mechanical sensitivity and good safety, with its cost lower than that of water-gel explosive. Worldwide, bulk emulsion explosive and its loading truck have been widely used. In China, as production safety is increasingly valued, bulk explosive is considered unsuitable to be used as exploder in the production process at a mining hill or mining pit because of its safety risk during transportation. Currently, the production process at a mining hill or mining pit basically utilizes an on-site mixer truck to perform mixing operation, there is no explosive product produced in the mixer truck during preparation, and the explosive product is not produced by sensitizing reaction until 10 minutes before final being loaded into a blast hole, which eliminates risk factors that exist in the transportation process of bulk emulsion explosive, however, the mixer truck in prior art still had safety risks in the production process.

The main components of explosive mixed in an on-site mixer truck is water phase, oil phase and sensitizer, wherein, the water phase solution flows from a water phase pump through a water phase gauge into an emulsification device, the oil phase liquid flows from an oil phase pump through an oil phase gauge into the emulsification device, the water phase and the oil phase are emulsified into emulsion matrix by high speed stirring in the emulsification device; the sensitizer flows from a sensitizer pump through a sensitizer gauge into a mixer, an in the meantime the emulsion matrix is also fed into the mixer to be mixed with the sensitizer; the mixed explosive slurry falls into a charging spout of a screw pump under self-gravity, and is pressed into a blast hole by pressure of the screw pump. In an actual mixing and loading process, because of mixing of the emulsion matrix and the sensitizer in the mixer, part of the matrix has foamed into explosive and already has certain sensitivity, with the existing mixer being a forced stirring device, when foreign substance such as metal impurity gets into the mixer, there is a risk of dangerous heat aggregation caused by friction; meanwhile, the medium pumped by the screw pump has already been emulsion explosive product, as known form experience of long term use of screw pump in the civil blasting industry and according to the structural principle of screw pump, there is great safety potential risk when using a screw pump to pump emulsion explosive product, which severely reduces the overall safety level of the emulsion explosive mixer truck, and multiple explosion accidents with certain casualty have been reported.

SUMMARY OF THE INVENTION

In order to solve the technical problem in prior art, the present invention provides a truck for loading emulsion explosive in field with intrinsic safety, which utilizes static devices for both the entire emulsification process and the entire sensitization process so as to eliminates risk factors that exist due to mechanical friction in the emulsification and sensitization process, and performs static mixing of sensitizer and emulsion matrix in a sensitizing device at a terminal end of a transporting hose, so that emulsion explosive product can only be formed in the blast hole, thereby greatly reducing safety risk and preventing personal injury.

The present invention is achieved by the following technical scheme:

A truck for loading emulsion explosive in field with intrinsic safety, comprising a vehicle chassis; an equipment platform mounted on an upper side of the vehicle chassis; a water and oil phase storage transporting system, a sensitizer storage transporting system, an onboard cleaning system, a static emulsification device, a hydraulic system, an auto-control system, a static sensitizing device and a pipe rolling device respectively mounted on the equipment platform; a transporting hose twined on the pipe rolling device, wherein, the water and oil phase storage transporting system comprises a water phase storage transporting system and an oil phase storage transporting system, with its key improvement being that, a terminal end of the water phase storage transporting system is connected to a water phase inlet of the static emulsification device, a terminal end of the oil phase storage transporting system is connected to an oil phase inlet of the static emulsification device, an outlet of the static emulsification device is connected with the transporting hose, a terminal end of the sensitizer storage transporting system is connected to a starting end of the transporting hose, the static sensitizing device is arranged at a terminal end of the transporting hose.

Preferably, the static emulsification device comprises the oil phase inlet, the water phase inlet, a flange sleeve, emulsification inner cores and an emulsification device outlet, wherein, an inner sleeve is provided inside the flange sleeve with a sealed cavity formed between an outer wall of the inner sleeve and an inner wall of the flange sleeve, the water phase inlet is provided on a side wall of the flange sleeve and is communicated with the sealed cavity, at least three stages of emulsification inner cores are mounted inside the inner sleeve along a longitudinal direction thereof, each of the emulsification inner cores comprises an emulsification cylinder and annular end plates fixed on both ends of the emulsification cylinder, with each of the annular end plates having an outer diameter equal to an inner diameter of the inner sleeve and being in contact with the inner sleeve in a sealed manner, an orifice plate is provided on one of the end plates of each emulsification inner core and has an array of through holes provided thereon, the end of each emulsification inner core with the orifice plate provided thereon is set as an outlet end, a chamber is formed by an outer wall of the emulsification cylinder, the end plates on both ends of the emulsification cylinder and an inner wall of the inner sleeve, diffluence holes are provided on a side wall of the inner sleeve and have a total number equal to that of the emulsification inner cores, the diffluence holes are communicated with the chamber outside the emulsification cylinder, at least two rows of jet holes are evenly distributed on the outer wall of the emulsification cylinder around an axis thereof.

Preferably, the static sensitizing device comprises a cylindrical body, a connector, and two stages of sensitizing inner cores provided inside the cylindrical body, wherein, the two stages of sensitizing inner cores includes a first-stage sensitizing inner core and a second-stage sensitizing inner core with the same structure which is a cylindrical structure having one closed end, a mixing chamber is formed by an inner chamber of either sensitizing inner core, scattering holes are provided on the closed end of either sensitizing inner core and are communicated with the mixing chamber, the scattering holes are evenly distributed around the axis of either sensitizing inner core, and the angle formed by an axis of each scattering hole and the axis of the corresponding sensitizing inner core is 10°-20°, the first-stage sensitizing inner core and the second-stage sensitizing inner core are mounted inside the cylindrical body after having their respective open ends joined.

Preferably, the water and oil phase storage transporting system comprises a water phase tank, an oil phase tank, a water phase pump and an oil phase pump, wherein, the water phase tank is mounted on a front part of the equipment platform, the oil phase tank is mounted on a middle part of the equipment platform, the water phase pump and the oil phase pump are mounted on a posterior part of the equipment platform, the water phase pump is connected to the water phase tank by a stainless steel pipe, an outlet of the water phase pump is connected to the water phase inlet of the static emulsification device by a stainless steel pipe, the oil phase pump is connected to the oil phase tank by a stainless steel pipe, an outlet of the oil phase pump is connected to the oil phase inlet of the static emulsification device by a stainless steel pipe, the water phase pump and the oil phase pump are respectively driven by a hydraulic motor.

The water phase pump is a screw pump that comprises a housing and two spiral rotors. The spiral rotors are non-rigid, so that unsafe factors during transportation are eliminated, and the safety level for water phase transportation is increased.

Preferably, the hydraulic system comprises a hydraulic oil tank, a power take-off unit, a main oil pump, a sensitizer pump motor, a water phase pump motor, an oil phase pump motor, a throttle valve, a pressure gauge and a pipe rolling device motor, wherein, the hydraulic oil tank is mounted on a front part of the equipment platform, a power output end of the power take-off unit is coupled to a power input end of the main oil pump, an oil outlet of the main oil pump is respectively connected to oil inlets of the sensitizer pump motor, the water phase pump motor, the pipe rolling device motor and the oil phase pump motor by hydraulic oil pipes.

Preferably, the onboard cleaning system comprises a flush water tank and a water pump, wherein, the flush water tank is mounted on a middle part of the equipment platform, the water pump is mounted on a posterior part of the equipment platform, an water inlet of the water pump is connected to an outlet of the flush water tank by a stainless steel pipe, an outlet of the water pump is respectively connected to water phase pipelines, the water phase inlet of the static emulsification device and an inlet of the static sensitizing device by stainless steel pipes.

Preferably, the sensitizer storage transporting system comprises a sensitizer tank and a sensitizer pump, wherein, the sensitizer tank is mounted on a middle part of the equipment platform, the sensitizer pump is mounted on a side wall of a flush water tank, the sensitizer tank and the sensitizer pump are connected by a stainless steel pipe, an outlet end of the sensitizer tank is connected to an outlet of the static emulsification device by a stainless steel pipe.

Preferably, the pipe rolling device comprises a bracket, a roller and a connecting member arranged on a posterior part of the equipment platform, wherein, a main shaft of the roller is mounted on the bracket by means of a bearing, the connecting member is fixed on the bracket, the transporting hose is twined on the roller, a starting end of the transporting hose is connected to an outlet end of the connecting member, an inlet end of the connecting member is connected to an outlet of the static emulsification device by a stainless steel pipe.

The auto-control system comprises a PLC module and an onboard GPS positioning system, wherein, the PLC module is mounted on a rear part of the equipment platform, the onboard GPS positioning system is mounted in a vehicle drive cabin.

As compared to prior art, the present invention has the following significant advantages:

(1) In the present invention, the sensitizing device is arranged at the terminal end of the transporting hose, and in the operation process, first, the sensitizing device at the terminal end of the transporting hose is placed into a blast hole, then the hydraulic system is turned on to perform emulsification, the emulsified emulsion matrix and the sensitizer are transported by the transporting hose into the sensitizing device to perform sensitization. No emulsion explosive product is formed outside the blast hole, so that safety risk is greatly reduced. Although the sensitizer and the emulsified emulsion matrix are both transported by the transporting hose, there is no mixing device arranged in the transporting process, therefore, no sensitized emulsion explosive is formed inside the transporting hose.

(2) The emulsification device in the present invention is a static emulsification device, and in the emulsification process, the oil phase is fed into the emulsification device by using the oil pump and then goes through the emulsification cylinders of the emulsification inner cores; jet holes are provided on the emulsification cylinders, the water phase is fed to the water phase inlet of the static emulsification device and then enters the cavity outside the emulsification cylinder corresponding to each stage of emulsification inner core through diffluence holes, and the water phase that has entered the cavity further jets into the respective emulsification cylinder through jet holes so as to physically stir the oil phase, the physically stirred coarse emulsion matrix goes through the respective orifice plate to be further mixed and then enter the next emulsification inner core. Five stages of inner cores are provided in the present invention, for the water phase and the oil phase to be sufficiently mixed to form homogeneous emulsion matrix. Because the stirring in the emulsification process is mainly done by means of the jetting force of the water phase, there is no physical shear or physical friction, so that safety risk is greatly reduced.

(3) The emulsification device in the present invention is a static sensitizing device, the emulsion matrix is transported through the transporting hose without any mixing or agitating device inside the transporting hose, so that the emulsion matrix and the sensitizer is transported forward only under the pressure of the water phase pump, the oil phase pump and the sensitizer pump in a sealed environment with low safety risk; after the emulsion matrix and the sensitizer enter the sensitizing device, they are scattered by the scattering holes provided on the two stages of sensitizing inner cores, the scattered mixture then enters the mixing chamber to be mixed and becomes sensitized after passing through the second-stage sensitizing inner core, so as to produce emulsion explosive product to be fed into the blast hole. By performing sensitization at the last link, it avoids direct transportation of explosive product and thereby reduces safety risk.

Figure 1:
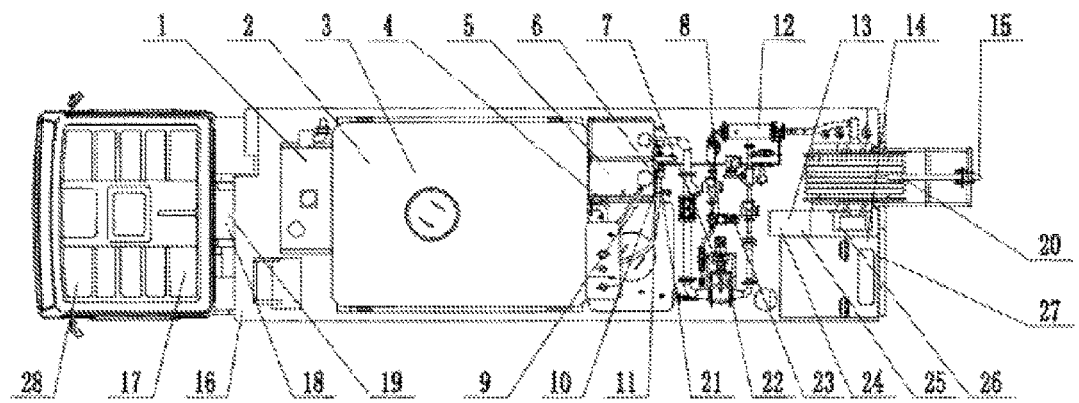
FIG. 1 is an elevation view of the present invention.
Figure 2:
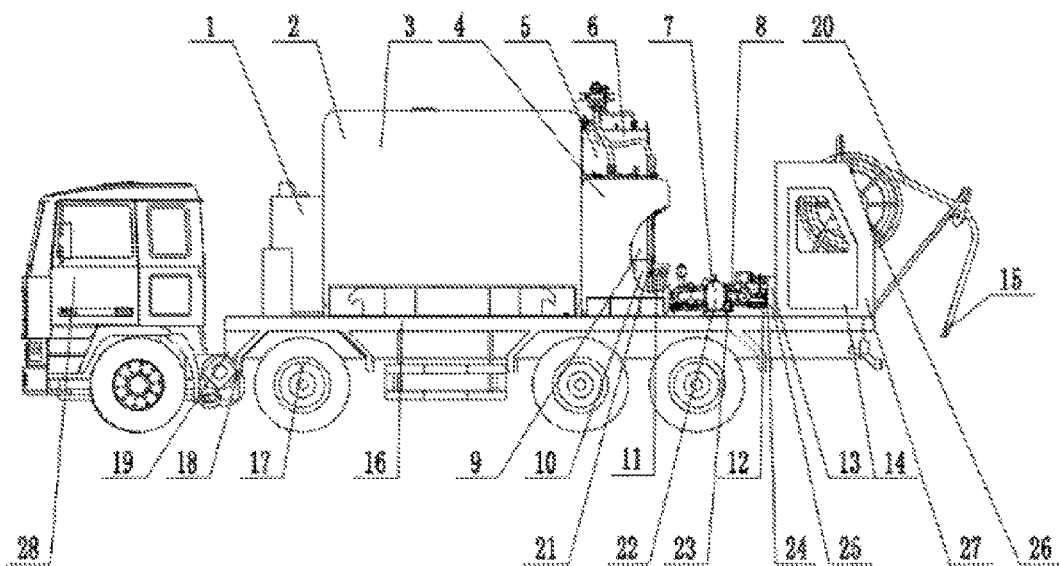
FIG. 2 is a top view of FIG. 1.

In the Figures:
1 hydraulic oil tank;
2 water and oil phase storage transporting system;
3 water phase tank
4 oil phase tank
5 sensitizer storage transporting system
6 sensitizer tank
7 water phase pump
8 oil phase pump
9 onboard cleaning system
10 flush water tank
11 sensitizer pump
12 static emulsification device
13 hydraulic system
14 auto-control system
15 static sensitizing device
16 equipment platform
17 vehicle chassis
18 power take-off unit
19 main oil pump
20 transporting hose
21 sensitizer pump motor
22 water phase pump motor
23 oil phase pump motor
24 throttle valve
25 pressure gauge
26 pipe rolling device motor
27 PLC module
28 onboard GPS positioning system
29 oil phase inlet
30 water phase inlet
31 flange sleeve
32 emulsification inner core
33 emulsification device outlet
34 diffluence hole
35 jet hole
36 orifice plate
37 connector
38 first-stage sensitizing inner core
39 second-stage sensitizing inner core
40 scattering hole
41 mixing chamber
42 housing
43 spiral rotor

DETAILED DESCRIPTION OF EMBODIMENTS

The present invention is further illustrated in detail below with reference to the appended drawings.
As shown in FIG. 1 to FIG. 5.
The present invention provides a truck for loading emulsion explosive in field with intrinsic safety, comprising: a vehicle chassis 17; an equipment platform 16 mounted on an upper side of the vehicle chassis 17; a water and oil phase storage transporting system 2, a sensitizer storage transporting system 5, an onboard cleaning system 9, a static emulsification device 12, a hydraulic system 13, an auto-control system 14, a static sensitizing device 15 and a pipe rolling device respectively mounted on the equipment platform 16; a transporting hose twined on the pipe rolling device. The water and oil phase storage transporting system 2 comprises a water phase storage transporting system and an oil phase storage transporting system. Wherein, a terminal end of the water phase storage transporting system is connected to a water phase inlet of the static emulsification device, a terminal end of the oil phase storage transporting system is connected to an oil phase inlet of the static emulsification device, an outlet of the static emulsification device is connected with the transporting hose, a terminal end of the sensitizer storage transporting system is connected to a starting end of the transporting hose, the static sensitizing device is arranged at a terminal end of the transporting hose.

Preferably, the static emulsification device 12 (shown in FIG. 4) comprises the oil phase inlet 29, the water phase inlet 30, a flange sleeve 31, emulsification inner cores 32 and an emulsification device outlet 33, wherein, an inner sleeve is provided inside the flange sleeve 31 with a sealed cavity formed between an outer wall of the inner sleeve and an inner wall of the flange sleeve, the water phase inlet is provided on a side wall of the flange sleeve and is communicated with the sealed cavity, at least three stages of emulsification inner cores are mounted inside the inner sleeve along a longitudinal direction thereof, each of the emulsification inner cores 32 comprises an emulsification cylinder and annular end plates fixed on both ends of the emulsification cylinder, with each of the annular end plates having an outer diameter equal to an inner diameter of the inner sleeve and being in contact with the inner sleeve in a sealed manner, an orifice plate 36 is provided on one of the end plates of each emulsification inner core 32 and has an array of through holes provided thereon, the end of each emulsification inner core 32 with the orifice plate 36 provided thereon is set as an outlet end, a chamber is formed by an outer wall of the emulsification cylinder, the end plates on both ends of the emulsification cylinder and an inner wall of the inner sleeve, diffluence holes are provided on a side wall of the inner sleeve and have a total number equal to that of the emulsification inner cores, the diffluence holes are communicated with the chamber outside the emulsification cylinder, at least two rows of jet holes are evenly distributed on the outer wall of the emulsification cylinder around an axis thereof.

Preferably, the static sensitizing device 15 (shown in FIG. 3) comprises a cylindrical body, a connector, and two stages of sensitizing inner cores provided inside the cylindrical body, wherein, the two stages of sensitizing inner cores includes a first-stage sensitizing inner core 38 and a second-stage sensitizing inner core 39 with the same structure which is a cylindrical structure having one closed end, a mixing chamber 41 is formed by an inner chamber of either sensitizing inner core, scattering holes 40 are provided on the closed end of either sensitizing inner core and are communicated with the mixing chamber 41, the scattering holes 40 are evenly distributed around the axis of either sensitizing inner core, and the angle formed by an axis of each scattering hole 40 and the axis of the corresponding sensitizing inner core is 10°-20°, the first-stage sensitizing inner core 38 and the second-stage sensitizing inner core 39 are mounted inside the cylindrical body after having their respective open ends joined.

Preferably, the water and oil phase storage transporting system 2 comprises a water phase tank 3, an oil phase tank 4, a water phase pump 7 (shown in FIG. 5) and an oil phase pump 8, wherein, the water phase tank 3 is mounted on a front part of the equipment platform 16, the oil phase tank 4 is mounted on a middle part of the equipment platform 16, the water phase pump) and the oil phase pump 8 are mounted on a posterior part of the equipment platform 16, the water phase pump 7 is connected to the water phase tank 3 by a stainless steel pipe, an outlet of the water phase pump 7 is connected to the water phase inlet 30 of the static emulsification device 12 by a stainless steel pipe, the oil phase pump 8 is connected to the oil phase tank 4 by a stainless steel pipe, an outlet of the oil phase pump 8 is connected to the oil phase inlet 29 of the static emulsification device 12 by a stainless steel pipe, the water phase pump 7 and the oil phase pump 8 are respectively driven by a hydraulic motor. The water phase pump 7 utilized in the present invention is a screw pump that comprises a housing 42 and two spiral rotors 43. The spiral rotors 43 are non-rigid, so that unsafe factors during transportation are eliminated, and the safety level for water phase transportation is increased.

Preferably, the hydraulic system 13 comprises a hydraulic oil tank 1, a power take-off unit 18, a main oil pump 19, a sensitizer pump motor 21, a water phase pump motor 22, an oil phase pump motor 23, a throttle valve 24, a pressure gauge 25 and a pipe rolling device motor 26, wherein, the hydraulic oil tank 1 is mounted on a front part of the equipment platform 16, a power output end of the power take-off unit 18 is coupled to a power input end of the main oil pump 19, an oil outlet of the main oil pump 19 is respectively connected to oil inlets of the sensitizer pump motor 21, the water phase pump motor 22, the pipe rolling device motor 26 and the oil phase pump motor 23 by hydraulic oil pipes.

Preferably, the onboard cleaning system comprises a flush water tank 10 and a water pump, wherein the flush water tank 10 is mounted on a middle part of the equipment platform 16, the water pump is mounted on a posterior part of the equipment platform 16, an water inlet of the water pump is connected to an outlet of the flush water tank 10 by a stainless steel pipe, an outlet of the water pump is respectively connected to water phase pipelines, the water phase inlet of the static emulsification device 12 and an inlet of the static sensitizing device 15 by stainless steel pipes.

Preferably, the sensitizer storage transporting system 5 comprises a sensitizer tank 6 and a sensitizer pump 11, wherein, the sensitizer tank 6 is mounted on a middle part of the equipment platform 16, the sensitizer pump 11 is mounted on a side wall of a flush water tank 10, the sensitizer tank 6 and the sensitizer pump 11 are connected by a stainless steel pipe, an outlet end of the sensitizer tank 6 is connected to an outlet of the static emulsification device 12 by a stainless steel pipe.

Preferably, the pipe rolling device (shown in FIG. 1) comprises a bracket, a roller and a connecting member arranged on a posterior part of the equipment platform 16, wherein, a main shaft of the roller is mounted on the bracket by means of a bearing, the connecting member is fixed on the bracket, the transporting hose 20 is twined on the roller, a starting end of the transporting hose 20 is connected to an outlet end of the connecting member, an inlet end of the connecting member is connected to an outlet of the static emulsification device 12 by a stainless steel pipe.

The auto-control system may be an automatic controller like in prior art, and may be added with various optional controllers such as a positioning system.

Preferably, the auto-control system 14 comprises a PLC module 27 and an onboard GPS positioning system 28, wherein, the PLC module 27 is mounted on a rear part of the equipment platform 16, the onboard GPS positioning system 28 is mounted in a vehicle drive cabin.

The operation principle and process of the present invention is as follows:

A truck for loading explosive in field that carries water phase material, oil phase material and sensitizer is driven to a blast site and parked near a blast hole that has been drilled, so as to ensure the transporting hose can inject the explosive according to the depth of the blast hole. The pipe rolling device motor is turned on, and a terminal end of the transporting hose 20 (mounted with the static sensitizing device) is put into the blast hole. The oil phase pump 8 and the water phase pump 7 is turned on, the two phases of material is emulsified in the static emulsification device 12. Under the pressure of the oil phase pump 8 and the water phase pump 7, the emulsion matrix is fed into the transporting hose 20. Then, the sensitizer pump 11 is turned on, and, the sensitizer together with the emulsion matrix is pushed under pressure into the static sensitizing device 15 at the terminal end of the transporting hose. A first-stage sensitizing inner core 38 and a second-stage sensitizing inner core 39 are mounted within the static sensitizing device 15, and a plurality of scattering holes 40 are distributed on the two stages of sensitizing inner cores, with a respective mixing chamber 41 formed therein. The emulsion matrix and the sensitizer are sufficiently mixed inside the static sensitizing device 15, so as to produce sensitized emulsion explosive to be filled into the bottom of the blast hole, waiting for detonation.

After a blast hole is filled, the water phase pump 7, the oil phase pump 8 and the sensitizer pump 11 are turned off sequentially, and then the pipe rolling device motor 26 is turned on, the transporting hose 20 is put into the next blast hole, thereby repeating the emulsification operation.

After the operations are complete, the onboard cleaning system 9 is turned on, so as to flush the water phase pipeline, the static emulsification device 12 and the static sensitizing device 15 for next time of use. After this is done, the truck is driven out from the operation zone.

Figure 4:
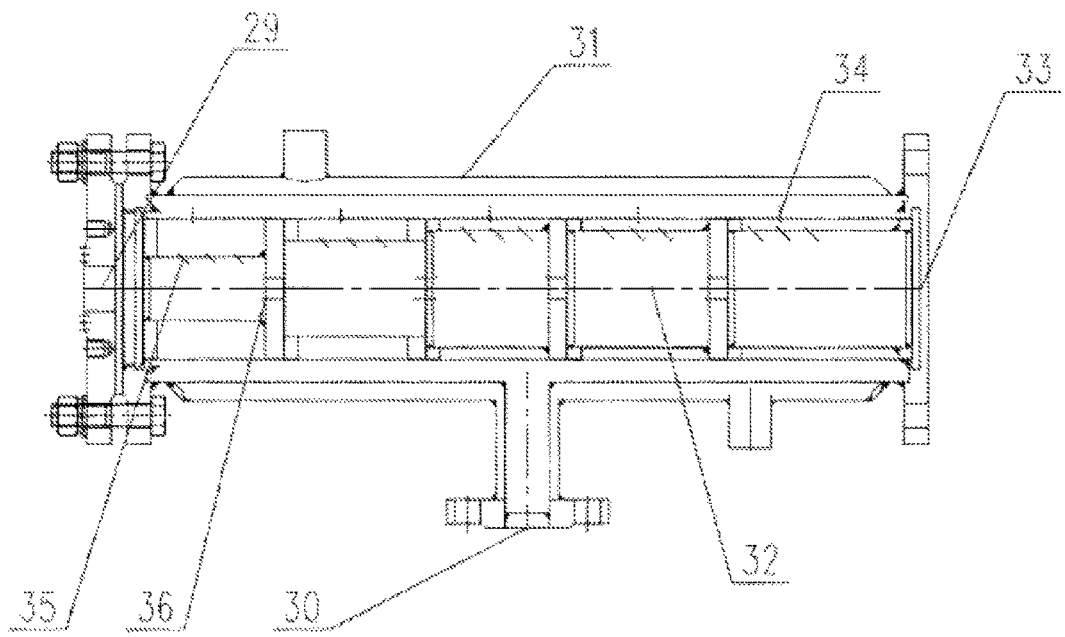
FIG. 4 is a structural schematic diagram of the static emulsification device of the present invention.
Figure 5:
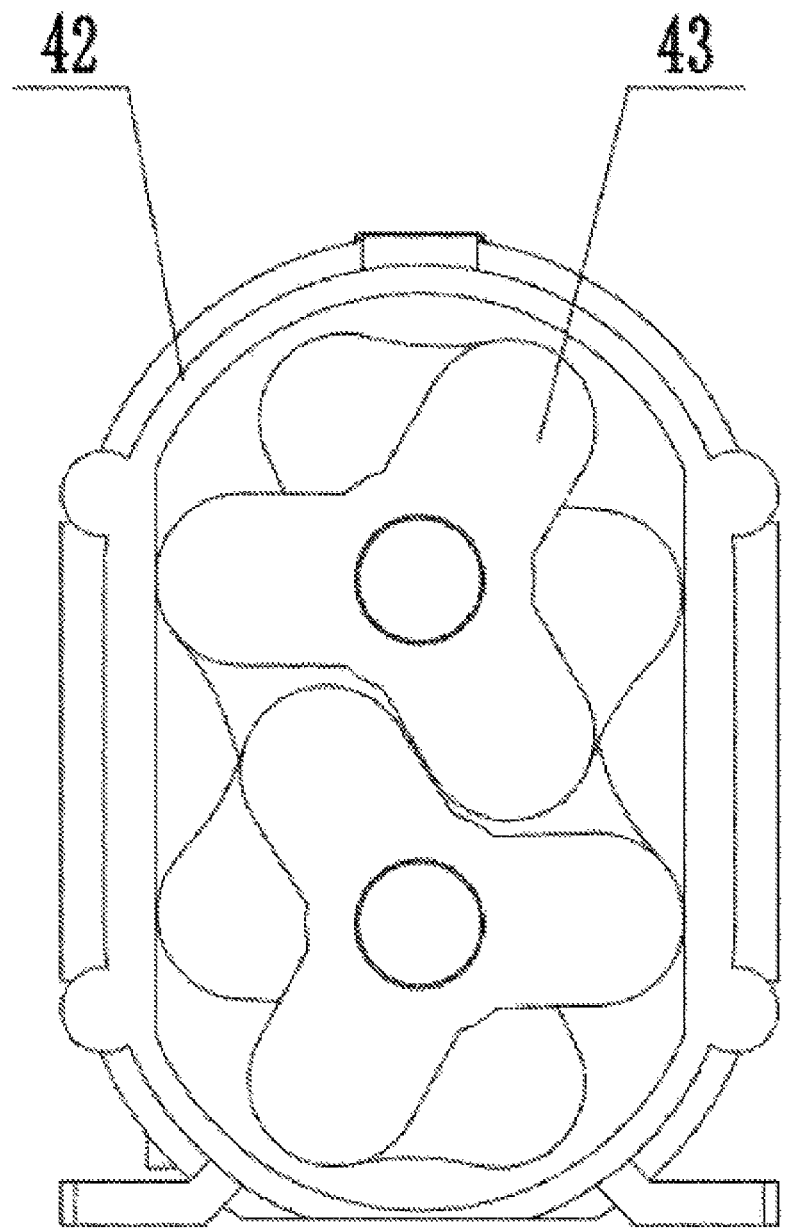
FIG. 5 is structural schematic diagram of the water phase pump of the present invention.

Referring to FIG. 4 which is a structural schematic diagram of the static sensitizing device of the present invention, the static emulsification device 12 of the present invention comprises the oil phase inlet 29, the water phase inlet 30, multiple stages of emulsification inner cores 32 (five stages are provided in the present embodiment, but this is not limited to five stages), a flange sleeve 31 and an emulsification device outlet 33, and its specific emulsification process is as follows:

The oil phase is fed into the first emulsification inner core 32 through a starting end of the oil phase inlet 29 of the static emulsification device 12 from the oil phase tank 4 by means of the oil phase pump 8 according to a ratio for emulsion explosive; the water phase is fed into the water phase inlet 30 from the water phase tank 3 by means of the water phase pump 7 according to a ratio for emulsion explosive, and then the water phase jets at a certain flow velocity and pressure from the jet holes 35 distributed on the emulsification inner core 32 of the static emulsification device 12 so as to enter the emulsification inner core 32 and be mixed with the oil phase, and then the mixture of the two jets at certain flow velocity through the end-face orifice plate 36 of the emulsification inner core 32 so as to form a first-stage coarse emulsion; the effluent is mixed again in the second emulsification inner core 32 with part of the water phase material whose flow is divided from the water phase inlet 30, and subsequently jets at certain flow velocity through the end-face orifice plate 36 of the second emulsification inner core 32 so as to form a second-stage emulsion; as so on, by going through multiple stages of repeated mixing and shear action, the emulsified emulsion is finally produced. Such a method for producing emulsion does not involve mechanical stirring or mechanical shear, and thus operates safely.

Figure 3:
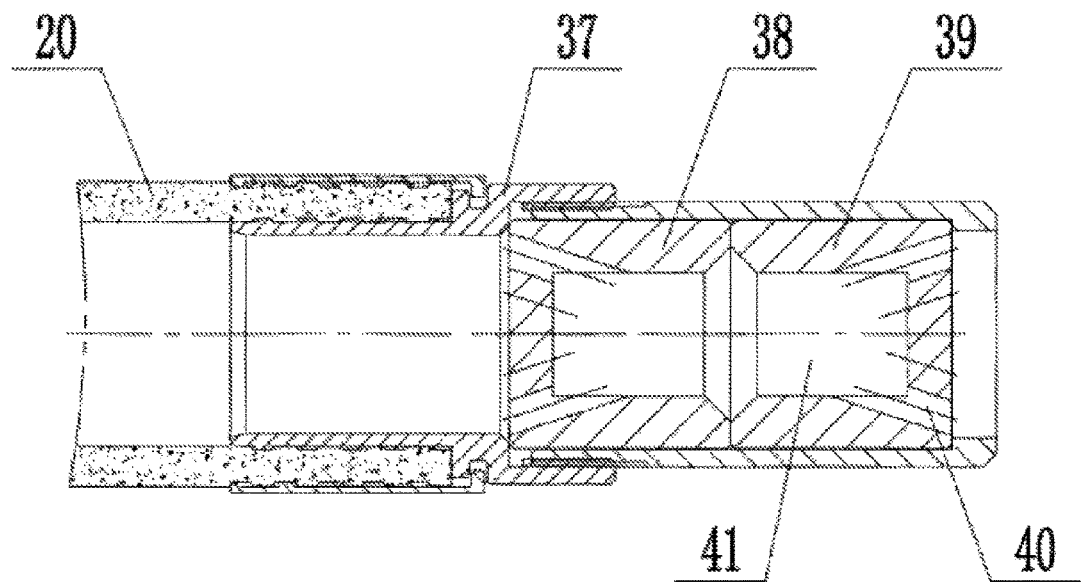
FIG. 3 is a structural schematic diagram of the static sensitizing device of the present invention.

Referring to FIG. 3 which is a structural schematic diagram of the static sensitizing device of the present invention, the static sensitizing device 15 of the present invention comprises a first-stage sensitizing inner core 38 and a second-stage sensitizing inner core 39 that are fixed at the terminal end of the transporting hose 20 by a connector 37. When injecting explosive into a blast hole, the static sensitizing device 15 is put into the blast hole together with the transporting hose 20. A plurality of scattering holes 40 are distributed on the two stages of sensitizing inner cores. The emulsion and the sensitizer are evenly scattered by passing through the scattering holes 40 into the mixing chamber 41, and then are scattered again by passing through the scattering holes of the second-stage sensitizing inner core, so as to achieve homogeneous mixing. Such a sensitizing method does not involve mechanical stirring, and there is no mechanical shear or mechanical collision, so that the sensitizing process is safe.

As compared to an emulsification mixer truck in prior art, in the whole operation process of the present invention, there is no high speed stirring emulsification device, no stirring sensitizing device, and instead, all the emulsification and sensitization processes during operation are done by static emulsification and static sensitization, thereby greatly improves the safety level of the emulsification and sensitization processes; in the meantime, in the present invention, no screw pump is used for transporting the emulsion, and the screw pump is removed from the explosive injecting system to make a safer explosive injecting system, thereby getting a truck for loading emulsion explosive in field with intrinsic safety.

This is the specific implementing operation method of the truck for loading emulsion explosive in field with intrinsic safety of the present invention.

In conclusion, by using the technical means discussed above, the present invention has the following technical effects:

(1) In the present invention, the sensitizing device is arranged at the terminal end of the transporting hose, and in the operation process, first, the sensitizing device at the terminal end of the transporting hose is placed into a blast hole, then the hydraulic system is turned on to perform emulsification, the emulsified emulsion matrix and the sensitizer are transported by the transporting hose into the sensitizing device to perform sensitization. No emulsion explosive product is formed outside the blast hole, so that safety risk is greatly reduced. Although the sensitizer and the emulsified emulsion matrix are both transported by the transporting hose, there is no mixing device arranged in the transporting process, therefore, no sensitized emulsion explosive is formed inside the transporting hose.

(2) The emulsification device in the present invention is a static emulsification device, and in the emulsification process, the oil phase is fed into the emulsification device by using the oil pump and then goes through the emulsification cylinders of the emulsification inner cores; jet holes are provided on the emulsification cylinders, the water phase is fed to the water phase inlet of the static emulsification device and then enters the cavity outside the emulsification cylinder corresponding to each stage of emulsification inner core through diffluence holes, and the water phase that has entered the cavity further jets into the respective emulsification cylinder through jet holes so as to physically stir the oil phase, the physically stirred coarse emulsion matrix goes through the respective orifice plate to be further mixed and then enter the next emulsification inner core. Five stages of inner cores are provided in the present invention, for the water phase and the oil phase to be sufficiently mixed to form homogeneous emulsion matrix. Because the stirring in the emulsification process is mainly performed by means of the jetting force of the water phase, there is no physical shear or physical friction, so that safety risk is greatly reduced.

(3) The emulsification device in the present invention is a static sensitizing device, the emulsion matrix is transported through the transporting hose without any mixing or agitating device inside the transporting hose, so that the emulsion matrix and the sensitizer is transported forward only under the pressure of the water phase pump, the oil phase pump and the sensitizer pump in a sealed environment with low safety risk; after the emulsion matrix and the sensitizer enter the sensitizing device, they are scattered by the scattering holes provided on the two stages of sensitizing inner cores, the scattered mixture then enters the mixing chamber to be mixed and becomes sensitized after passing through the second-stage sensitizing inner core, so as to produce emulsion explosive product to be fed into the blast hole. By performing sensitization at the last link, it avoids direct transportation of explosive product and thereby reduces safety risk.

The invention claimed is:

1. A truck for loading emulsion explosive in field with intrinsic safety, comprising:
   a vehicle chassis;
   an equipment platform mounted on an upper side of the vehicle chassis;
   a water and oil phase storage transporting system, a sensitizer storage transporting system, an onboard cleaning system, a static emulsification device, a hydraulic system, an auto-control system, a static sensitizing device and a pipe rolling device respectively mounted on the equipment platform; and
   a transporting hose twined on the pipe rolling device, wherein
      the water and oil phase storage transporting system comprises a water phase storage transporting system and an oil phase storage transporting system, a terminal end of the water phase storage transporting system is connected to a water phase inlet of the static emulsification device, a terminal end of the oil phase storage transporting system is connected to an oil phase inlet of the static emulsification device,
      an outlet of the static emulsification device is connected with the transporting hose, a terminal end of the sensitizer storage transporting system is connected to a starting end of the transporting hose, the static sensitizing device is arranged at a terminal end of the transporting hose, and
      the static sensitizing device comprises a cylindrical body, a connector, and two stages of sensitizing inner cores provided inside the cylindrical body, wherein the two stages of sensitizing inner cores includes a first-stage sensitizing inner core and a second-stage sensitizing inner core with the same structure which is a cylindrical structure having one closed end, a mixing chamber is formed by an inner chamber of either sensitizing inner core, scattering holes are provided on the closed end of either sensitizing inner core and are communicated with the mixing chamber, the scattering holes are evenly distributed around the axis of either sensitizing inner core, and the angle formed by an axis of each scattering hole and the axis of the corresponding sensitizing inner core is 10°-20°, the first-stage sensitizing inner core and the second-stage sensitizing inner core are mounted inside the cylindrical body after having their respective open ends joined.

2. The truck of claim 1, wherein the static emulsification device comprises the oil phase inlet the water phase inlet, a flange sleeve, emulsification inner cores and an emulsification device outlet, wherein an inner sleeve is provided inside the flange sleeve with a sealed cavity formed between an outer wall of the inner sleeve and an inner wall of the flange sleeve, the water phase inlet is provided on a side wall of the flange sleeve and is communicated with the sealed cavity, at least three stages of emulsification inner cores are mounted inside the inner sleeve along a longitudinal direction thereof, each of the emulsification inner cores comprises an emulsification cylinder and annular end plates fixed on both ends of the emulsification cylinder, with each of the annular end plates having an outer diameter equal to an inner diameter of the inner sleeve and being in contact with the inner sleeve in a sealed manner, an orifice plate is provided on one of the end plates of each emulsification inner core and has an array of through holes provided thereon, the end of each emulsification inner core with the orifice plate provided thereon is set as an outlet end, a chamber is formed by an outer wall of the emulsification cylinder, the end plates on both ends of the emulsification cylinder and an inner wall of the inner sleeve, diffluence holes are provided on a side wall of the inner sleeve and have a total number equal to that of the emulsification inner cores, the diffluence holes are communicated with the chamber outside the emulsification cylinder, at least two rows of jet holes are evenly distributed on the outer wall of the emulsification cylinder around an axis thereof.

3. The truck of claim 1, wherein the water and oil phase storage transporting system comprises a water phase tank, an oil phase tank, a water phase pump and an oil phase pump, wherein the water phase tank is mounted on a front part of the equipment platform, the oil phase tank is mounted on a middle part of the equipment platform, the water phase pump and the oil phase pump are mounted on a posterior part of the equipment platform, the water phase pump is connected to the water phase tank by a stainless steel pipe, an outlet of the water phase pump is connected to the water phase inlet of the static emulsification device by a stainless steel pipe, the oil phase pump is connected to the oil phase tank by a stainless steel pipe, an outlet of the oil phase pump is connected to the oil phase inlet of the static emulsification device by a stainless steel pipe, the water phase pump and the oil phase pump are respectively driven by a hydraulic motor.

4. The truck of claim 3, wherein the water phase pump is a screw pump that comprises a housing and two spiral rotors.

5. The truck of claim 1, wherein the hydraulic system comprises a hydraulic oil tank, a power take-off unit, a main oil pump, a sensitizer pump motor, a water phase pump motor, an oil phase pump motor, a throttle valve, a pressure gauge and a pipe rolling device motor, wherein the hydraulic oil tank is mounted on a front part of the equipment platform, a power output end of the power take-off unit is coupled to a power input end of the main oil pump, an oil outlet of the main oil pump is respectively connected to oil inlets of the sensitizer pump motor, the water phase pump motor, the pipe rolling device motor and the oil phase pump motor by hydraulic oil pipes.

6. The truck of claim 1, wherein the onboard cleaning system comprises a flush water tank and a water pump, wherein the flush water tank is mounted on a middle part of the equipment platform, the water pump is mounted on a posterior part of the equipment platform, an water inlet of the water pump is connected to an outlet of the flush water tank by a stainless steel pipe, an outlet of the water pump is respectively connected to water phase pipelines, the water phase inlet of the static emulsification device and an inlet of the static sensitizing device by stainless steel pipes.

7. The truck of claim 1, wherein the sensitizer storage transporting system comprises a sensitizer tank and a sensitizer pump, wherein the sensitizer tank is mounted on a middle part of the equipment platform, the sensitizer pump is mounted on a side wall of a flush water tank, the sensitizer tank and the sensitizer pump are connected by a stainless steel pipe, an outlet end of the sensitizer tank is connected to an outlet of the static emulsification device by a stainless steel pipe.

8. The truck of claim 1, wherein the pipe rolling device comprises a bracket, a roller and a connecting member arranged on a posterior part of the equipment platform, wherein a main shaft of the roller is mounted on the bracket by means of a bearing, the connecting member is fixed on the bracket, the transporting hose is twined on the roller, a starting end of the transporting hose is connected to an outlet end of the connecting member, an inlet end of the connecting member is connected to an outlet of the static emulsification device by a stainless steel pipe.

9. The truck of claim 1, wherein the auto-control system comprises a PLC module and an onboard GPS positioning system, wherein the PLC module is mounted on a rear part of the equipment platform, the onboard GPS positioning system is mounted in a vehicle drive cabin.

* * * * *